United States Patent [19]
Doll et al.

[11] 3,809,070
[45] May 7, 1974

[54] NON-INVASIVE ELECTROMAGNETIC BLOODFLOW MEASURING SYSTEM WITH REJECTION OF NOISES

[75] Inventors: Henri Georges Doll, New York; Hans J. Broner, Glendale, both of N.Y.

[73] Assignee: Doll Research, Inc., New York, N.Y.

[22] Filed: Oct. 11, 1972

[21] Appl. No.: 296,677

Related U.S. Application Data

[63] Continuation-in-part of Ser. No. 158,697, July 1, 1971, Pat. No. 3,759,247, which is a continuation-in-part of Ser. No. 66,240, Aug. 24, 1970, Pat. No. 3,659,591.

[52] U.S. Cl............................ 128/2.05 F, 73/194 EM
[51] Int. Cl............................................. A61b 5/02
[58] Field of Search................ 128/2.05 F, 2.05 R; 73/194 EM

[56] References Cited
UNITED STATES PATENTS

| | | | |
|---|---|---|---|
| 3,659,591 | 5/1972 | Doll et al. | 128/2.05 F |
| 2,867,119 | 1/1959 | Sturgeon et al. | 73/194 EM |
| 3,131,560 | 5/1964 | Cushman et al. | 73/194 EM |
| 3,184,966 | 5/1965 | Thornton et al. | 73/194 EM |
| 3,377,855 | 4/1968 | Coia et al. | 73/194 EM |
| 3,717,031 | 2/1973 | Biscar | 73/194 EM |

OTHER PUBLICATIONS

Abel, F. L., I.R.E. Trans. On Med. Electronics., Dec. 1959, pp. 216–219.
Spencer, M. P. et al., I.R.E. Trans. on Med. Electronics, Dec. 1959, pp. 220–227.
Ellis, R. J., et al., Journ. of Assoc. for Advancement of Med. Instrumentation, Vol. 6, No. 2, Mar.–Apr. 1972, pp. 116–121.

*Primary Examiner*—Kyle L. Howell

[57] ABSTRACT

A non-invasive measuring system adapted to measure arterial blood flow in human beings is provided. A stable, strong magnetic field is produced in the region of the artery under measurement by a magnet suitably positioned near the human being. A mechanical means moves the magnet away from its normal position or back to such position. The blood flow induced signals, which are pulsatile, are sensed by electrodes placed on the skin adjacent to the artery. Mixed with the blood flow signals are the local electrocardiogram signals. In addition, the electrodes also pick up random noises which are not synchronized with the heart. The signals are amplified and processsed by a repetitive waveform averager which is synchronized by a cardiogram signal obtained from auxiliary electrodes. The waveform averager accumulates a first predetermined number of composite pulsatile signals from said measuring electrodes during a first series of heart cycles occurring when the magnetic field is produced in the region of the artery, and accumulates an equal number of composite pulsatile signals from said measuring electrodes during a second series of heart cycles occurring when the magnetic field in the region is suppressed. A signal selector includes a comparator connected at the input of the waveform averager for comparing each incoming pulsatile signal with predetermined acceptable signal characteristics, so that the incoming pulsatile signal will be accumulated by the waveform averager only if it is accepted by the signal selector. The waveforms registered in the waveform averager respectively during the first and the second series of heart cycles are subtracted from each other to obtain the blood flow pulse substantially free from electrocardiogram and random noise influence.

39 Claims, 15 Drawing Figures

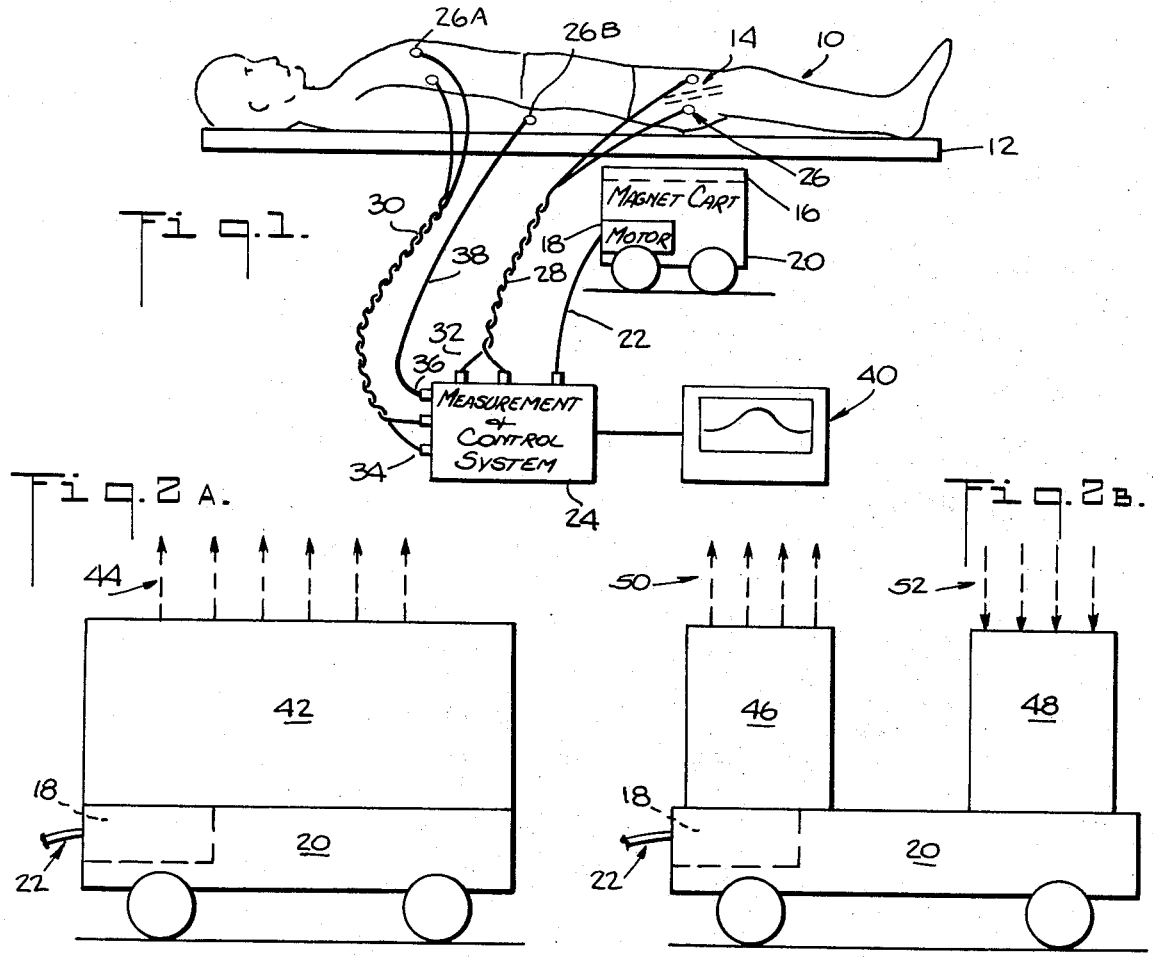

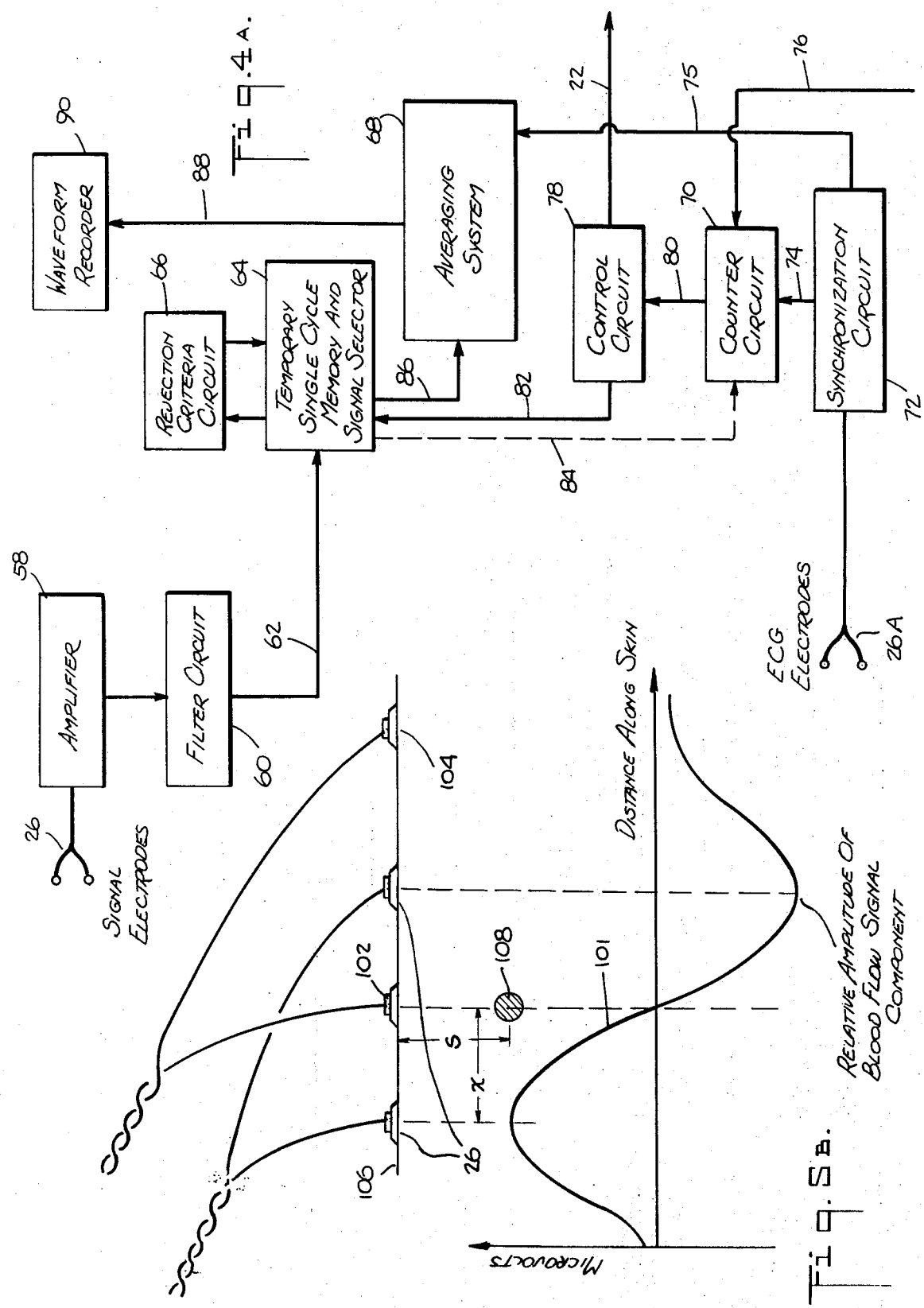

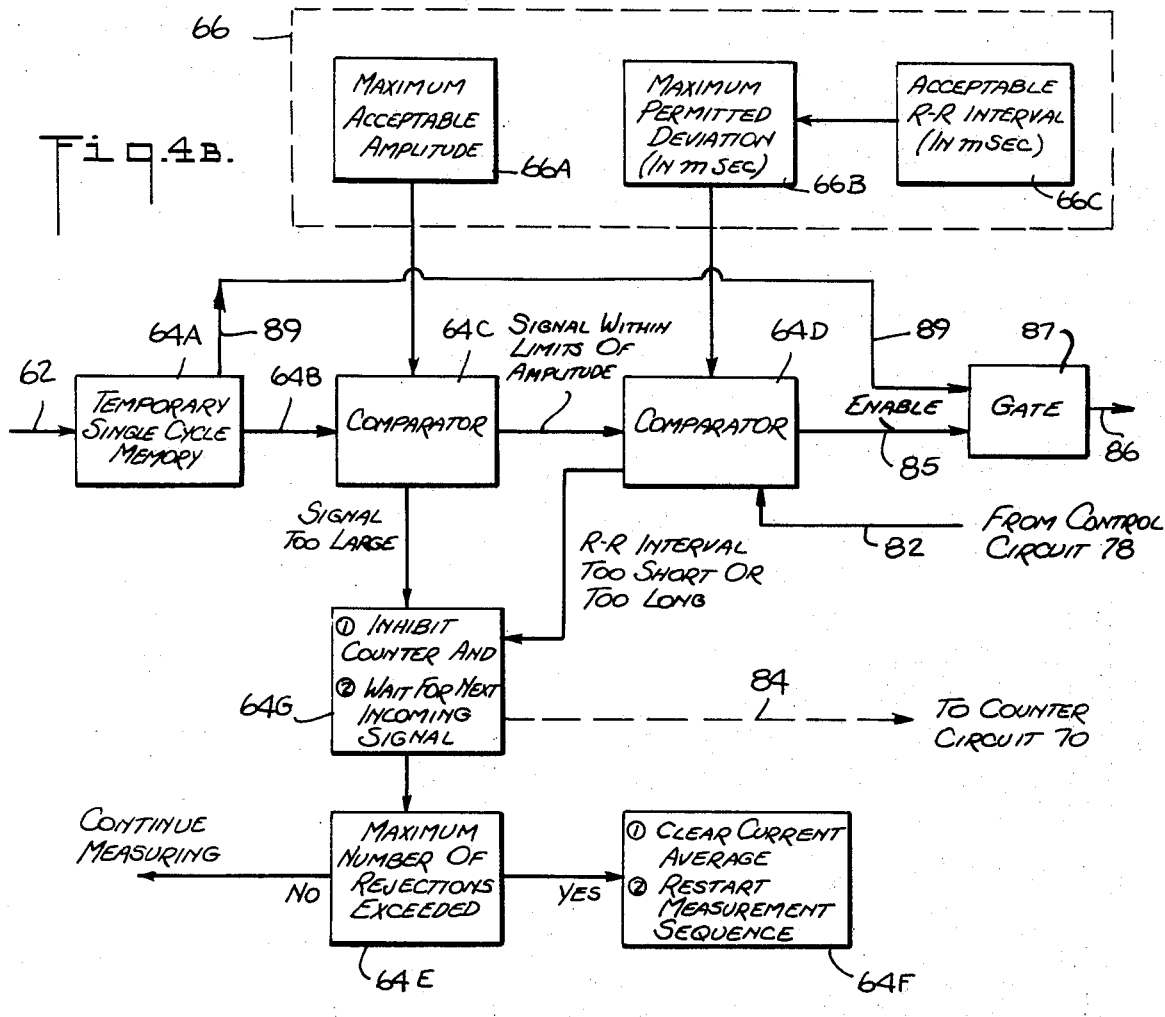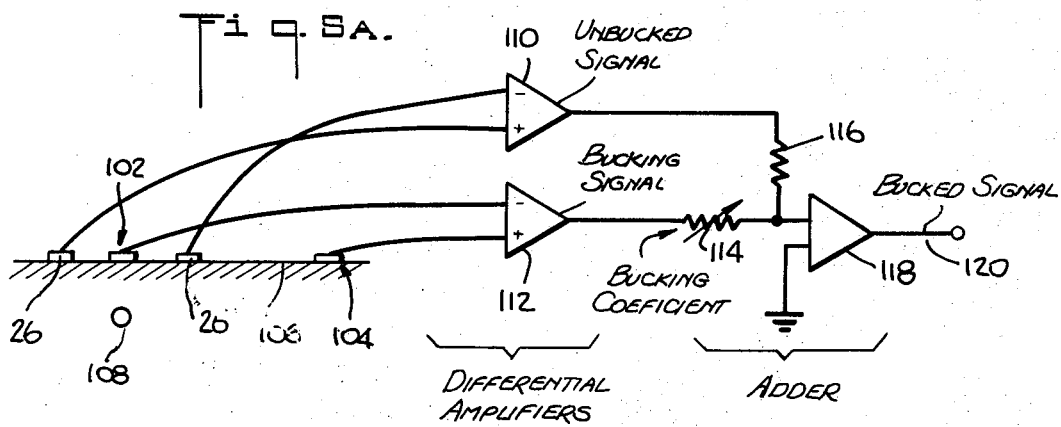

NON-INVASIVE ELECTROMAGNETIC BLOODFLOW MEASURING SYSTEM WITH REJECTION OF NOISES

CROSS-REFERENCE TO RELATED PATENT APPLICATIONS

This is a Continuation-in-Part application of U.S. Pat. Application Ser. No. 158,697, filed on July 1, 1971, by Henri G. Doll and Hans J. Broner and entitled ELECTROMAGNETIC FLOWMETER, now U.S. Pat. No. 3,759,247, which application in turn is a Continuation-in-Part application of U.S. Pat. Application Ser. No. 66,240, filed on Aug. 24, 1970 by Henri G. Doll and Hans J. Broner and entitled, ELECTROMAGNETIC FLOWMETER, now U.S. Pat. No. 3,659,591.

BACKGROUND OF THE INVENTION

1. Field of the Invention

This invention relates to blood flow measuring systems and more particularly to a non-invasive type measuring system for monitoring the flow pulse in the blood vessels of living beings.

2. Description of the Prior Art

In general, electromagnetic flowmeters for the measurement of the blood flow have been invasive, i.e., they have required surgical exposure of the blood vessel under measurement and implantation of at least part of the sensing device about such vessel. Such meters are severely limited in their application and not suitable for clinical use due to the necessity of such surgical procedures and the attendant sterility problems. In addition, not all blood vessels may be exposed in this way since those that have become arteriosclerotic are brittle and may be damaged in the implanting procedure. The scars caused by the surgical procedure also dictate against the use of invasive flow meters except in the most critical cases. For these reasons, the invasive flowmeters are rarely used on human beings and are mostly used for experiments on anesthetized animals.

Besides these physical limitations in known electromagnetic flowmeters, such meters have also had severe drawbacks in the electronic sensing and measurement system. Since the desired blood flow signal is mixed in with unwanted noise signals created in the body, and in the electronic system itself, it has been found difficult to eliminate the noise in order to obtain an accurate blood flow reading. Such noise includes extraneous signals caused by poor placement of the flowmeter around the vessel under measurement, noise created by electrical interaction of the elements of the flowmeter sensor and between the sensor and the tissue with which it is in contact, quadrature effect in sine wave type flowmeters and transformer spikes in square wave type flowmeters.

It is desirable that the blood flow measurement by the flowmeter be taken during a period of constant magnetic field, and that the flowmeter be simple to operate and capable of monitoring the blood flow in a number of vessels in the same individual.

SUMMARY OF THE INVENTION

It is an object of the present invention to provide an electromagnetic non-invasive blood flow measuring system which measures the waveform of the blood flow pulse in living beings without surgical implantation of sensors in the being.

It is another object of the present invention to provide an electromagnetic blood flow measuring system in which a permanent magnet or a D.C. powdered electromagnet, situated outside of the being, is used to produce, in the region of the blood flow measurement, the necessary magnetic field, and in which the measuring electrodes are placed on the skin of the being adjacent to the vessel to be measured.

It is another object of the present invention to provide a non-invasive blood flow measuring system which provides a waveform of the blood flow pulse averaged over a number of heart cycles to eliminate the random noise normally appearing between the measuring electrodes.

It is another object of the invention to provide a blood flow measuring system wherein the averaging means are part of a measurement and control system synchronized by means of a reference electrocardiogram signal.

It is another object of the invention to provide a blood flow measuring system wherein the local electrocardiogram component appearing between the measuring electrodes is eliminated by compensation.

It is another object of the invention to provide a blood flow measuring system wherein abnormal heart cycles, which are either too short, or too long, or contain an abnormally large spurious noise, are recognized and rejected in order not to degrade the averaged blood flow waveform.

It is another object of the invention to provide a blood flow measuring system comprising adequate means to eliminate the local electrocardiogram component from the averaged waveform, even when the electrocardiogram amplitude is many times as large as the blood flow signal amplitude.

These and other objects are achieved by the present invention which provides a blood flow measuring system particularly adapted to measure arterial blood flow waveforms in human beings. Included is a measurement and control system comprising a pair of auxiliary electrodes located on the body where a strong and sharp cardiogram pulse can be repeatedly obtained to be used as a synchronizing signal and as a clock, a magnet system consisting of permanent magnets and/or DC powered electromagnets designed for the production of a strong and homogeneous magnetic field in the region of the artery under study, and a motorized cart to move the magnet system, if of the permanent type, away from its normal position or back to such position in accordance with the instructions of the control system. Also included is a pair of measuring electrodes placed on the skin adjacent to the artery under study, an amplifier to amplify the signals appearing between the pair of measuring electrodes, and a repetitive waveform averaging system synchronized by the synchronizing signal obtained from the auxiliary electrodes.

The blood flow induced signals, which are pulsatile, are sensed by the measuring electrodes. Mixed with the blood flow signals are the electrocardiogram signals, also pulsatile in nature, appearing between the same measuring electrodes. Both the blood flow signals and the local waveforms repeat regularly with each heart cycle. In addition, the electrodes also pick up random noises which are not synchronized with the heart. The operation of the control system is such that the pulsatile signal measured during each of predetermined number n of heart cycles will be introduced in the averaging system while the magnetic field is applied to the artery, after which the measuring circuit is deactivated and the magnet automatically moved so as to essentially suppress the magnetic field at the artery. The polarity of the averaging system is then reversed and the measuring circuit reactivated, after which the pulsatile signals appearing at the measuring electrodes in the absence of the magnetic field during an equal number n of heart cycles is introduced in the averaging system. In that process, the random noise is eliminated by averaging, and the local cardiogram waveform accumulated during the first series of n heart cycles is substantially cancelled by the identical waveforms of opposite polarity accumulated during the second series of n heart cycles. The averaging system thereafter contains only the blood flow waveform accumulated during the first series of n heart cycles, free from cardiogram and random noise degradation. This blood flow waveform can then be transferred automatically to a display or recording system.

The repetitive waveform averager can be of the analog type. It is, however, preferred to accomplish the waveform averaging with a digital computer since the same computer can also perform other signal processing operations. Since blood flow signals are generated in analog form, the computer must be equipped with analog to digital converters in the input circuit. Similarly, the computer must be equipped with digital to analog converters in the output stage for the recording or display of the blood flow waveform.

According to another embodiment of the invention, the computer is programmed to examine the composite pulsatile signal, picked up by the measuring electrodes corresponding to each of the successive heart cycles, for spurious noise components of large amplitude, such as those due to premature beats, muscle signals and motion artifacts. In addition, the computer detects cycles that are of abnormally short or long duration, with respect to the average heart cycle duration of the subject. To prevent such abnormal cycles from degrading the averaged flow pulse waveform, the composite pulsatile signal of each heart cycle is first stored in a temporary memory within the computer for examination. The composite pulsatile signal is added to the average, which is in another memory, only after the computer has determined that the cycle in question is not abnormal in either amplitude or duration. Rejected cycles are not added and do not increment the cycle counting circuit.

According to another embodiment of the invention, a technique is described for making blood flow measurement on an artery, such as the ascending aorta, where, because of the proximity to the heart, the electrocardiogram is of very large amplitude with respect to the blood flow signals. To bring the cardiogram amplitude to the level of the blood flow signals, use is made of an auxiliary pair of measuring electrodes so located that the electrocardiogram between them is at all times very similar to the electrocardiogram between the flow measuring electrodes. This electrocardiogram between the auxiliary measuring electrodes, referred to as the "bucking" cardiogram, is subtracted in analog form from the composite pulsatile signal between the measuring electrodes, leaving only the blood flow signal, the "residual electrocardiogram" and the random noise to be transferred to the computer for processing. From this point the signal is treated exactly as in the technique previously described for the case where bucking is not required.

It is to be understood that, as used herein, the term "non-invasive blood flow measuring system" is intended to mean a system wherein surgical exposure of the blood vessel under measurement is not required, and wherein there is no surgical implantation of parts of the sensing device about the blood vessel. However, the use of the expression "non-invasive" in this context does include a flow meter wherein the sensing electrodes are either placed on the surface of the skin or are implanted in the tissue without requiring surgery, such as by injection by a hypodermic syringe.

It is also to be understood that, as used herein, the term "composite pulsatile signal" is intended to mean the total signal produced between a pair of measuring electrodes for each of a given number of heart cycles when a strong and homogeneous magnetic field is applied in the region of the artery under study. The composite pulsatile signal is constituted by a blood flow waveform component, a local cardiogram component and random noise. In this connection, the term "measuring electrodes" is intended to mean the electrodes used for making measurements related to the artery under study Also, the term "auxiliary electrodes" is intended to mean those electrodes used for picking up a strong and sharp cardiogram pulse for use as a synchronizing signal and as a clock.

It is also to be understood that the term "local cardiogram" is intended to mean the cardiogram waveform existing between the measuring electrodes in the absence of magnetic field. The local cardiogram and "the local cardiogram component" are identical, but the latter forms a portion of the composite pulsatile signal taken by the measuring electrodes when the magnetic field is active.

It is also to be understood that, as used herein, the term "bucking cardiogram" refers to the pulsatile signal picked up by a pair of auxiliary electrodes, which signal is used to "buck" or cancel out most of the local cardiogram component taken by measuring electrodes. Bucking the local cardiogram is particularly useful when measuring near the heart, such as at the ascending aorta. Also, the "residual" or "bucked" cardiogram is intended to mean the pulsatile signal representing the difference between the bucking cardiogram waveform and the local cardiogram waveform.

It is also to be understood that, as used herein, the term "active magnetic field" is intended to mean a magnetic field which is strong and homogeneous in the region of the artery under measurement. Similarly, the terms "inactive" or "suppressed" magnetic field are intended to mean magnetic fields which are substantially negligible in the region of the artery.

BRIEF DESCRIPTION OF THE DRAWINGS

FIG. 1 is a diagrammatic view of a preferred embodiment of the measuring system according to the present invention, illustrating measurement of blood flow in the femoral artery of a human being;

FIGS. 2A and 2B, respectively, show two embodiments of the permanent magnet system employed with the invention;

FIG. 3 illustrates the method of electrocardiogram elimination and averaging process in mathematical notation;

FIG. 4A is a circuit block diagram of the computer circuitry employed for providing the processing of the blood flow signals as described in FIG. 3, and FIG. 4B is a detailed circuit diagram of the temporary single cycle memory and signal selector, and the rejection criteria circuit of FIG. 4A;

FIG. 5A shows the polarity of the connections to the preamplifiers and the adder circuit for bucking the local ECG, and FIG. 5B shows the electrode placement for bucking the local ECG and a voltage profile of the blood flow signal component;

FIG. 6 shows an operation flow diagram of the circuitry employed for bucking the cardiogram component of the composite pulsatile signal;

DESCRIPTION OF THE PREFERRED EMBODIMENTS

Figure 8:
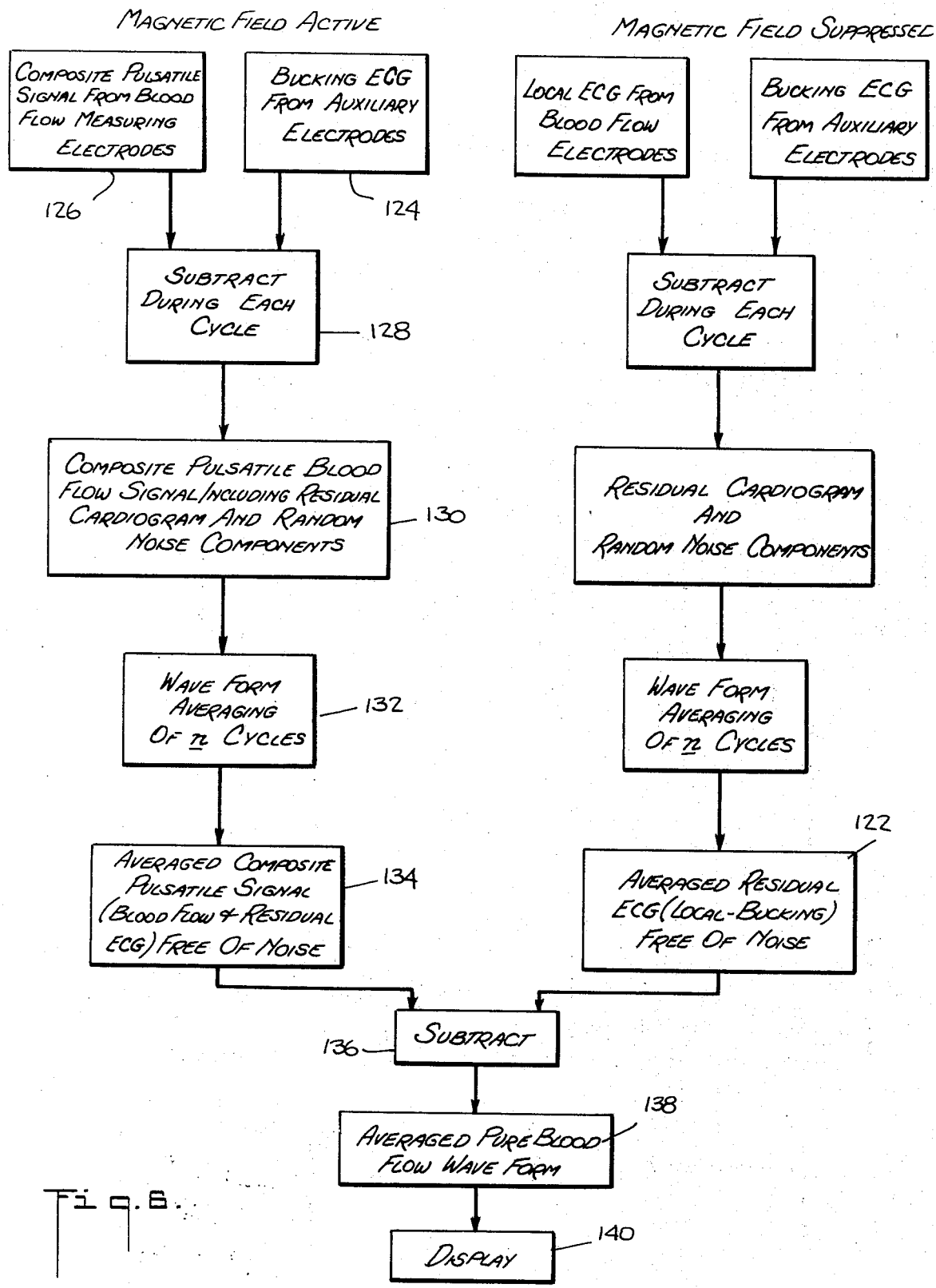
FIG. 8 is a representative waveform diagram of the PQRST electrocardiogram signal of the human heart.

Referring now to the drawings, there is shown in FIG. 1 a general diagrammatic view of a preferred embodiment of the blood flow measuring system used according to the present invention to measure the blood flow rate through the femoral artery of a patient. As shown, a patient 10 is lying in a prone position on examination table 12. Since it is desired to measure the blood flow rate through the right femoral artery 14 of the patient, a homogeneous magnetic field is created in the region of the artery 14 by means of a permanent magnet 16. The strength of this magnetic field must be sufficient so that a detectable electrical signal induced by the passage of blood through the magnetic field in the femoral artery is present at the skin surface of the leg.

The permanent magnet 16 replaces the electromagnetic coil employed in the system, shown and described in the U.S. Pat. No. 3,659,591 referred to above and entitled ELECTROMAGNETIC FLOWMETER, issued on May 2, 1972 to the same inventors of the present application.

In the U.S. Pat. No. 3,759,247, referred to above and entitled ELECTROMAGNETIC FLOWMETER, issued on Sept. 18, 1973 to the same inventors as in the subject application, there is shown and described the use of permanent magnets for providing the stable and homogeneous magnetic field required at the artery under study.

It has been found that the use of permanent magnets as the magnetic field source of the blood flow measurement system is advantageous in a hospital environment. One advantage is the fact that permanent magnets do not have the heat dissipation associated with electromagnets. The need for electronically controlled driving power is also eliminated.

More specifically, referring to FIG. 1, there is shown a permanent magnet system wherein the permanent magnet 16 is arranged beneath the patient's bed in such fashion that the magnetic field, or at least its vertical component, is reasonably constant over a large enough volume embracing the artery under investigation and the skin electrodes. The intensity of the magnetic field must be large enough so that measurable signals are generated by the movement of the blood in the magnetic field. Also, the field must be reasonably homogeneous so that movements of the body with respect to the field do not generate large voltages unrelated to the blood flow.

One arrangement of the permanent magnet 16 is to have several blocks made of magnetic material having a rectangular shape and arranged in stacks. The total weight of these blocks may be in the neighborhood of 800 pounds when stacked to provide a magnetic field of sufficient strength. Because of this large weight it is difficult to physically reverse the polarity of the magnetic field produced in the region under measurement. Also, it is not feasible to employ electrical means for reversing the polarity of the magnetic field. Thus, it is preferable to employ a means of suppressing the magnetic field by moving the magnet system away from the region under study during a portion of the measurement sequence.

In FIG. 1, the permanent magnet 16 is supported on a motorized cart 20 having a motor 18 which is controlled via electrical power and control signals received on control signal line 22 from measurement and control system 24. Thus, the permanent magnet 16 can be mechanically moved away from the measurement area to suppress the effect of the magnetic field with respect to the artery under study during a portion of the measurement sequence.

The method whereby the magnetic field is suppressed during certain portions of the measuring sequence so as to eliminate the local cardiogram is as follows: when the magnet cart 20 receives a command signal from the control signal line 22, the permanent magnet 16 will be moved from its normal location under the artery to a location three or four feet away. This displacement is all that is needed for the effect of the magnetic field to become negligible in the region under investigation. Control signals are provided on line 22 from measurement and control system 24 to move the magnet cart 20 in either the forward or reverse direction so that permanent magnet 16 is moved into or out of its effective working area under the patient. While the magnet is away, and the magnetic field is suppressed, the only periodical signal synchronized with the heart beats is the local cardiogram component picked up by the pair of measuring electrodes 26.

FIG. 1 shows the relative positioning of permanent magnet 16 for the measurement of blood flow through the right femoral artery 14 of patient 10 as well as the relative positioning of electrodes 26 for sensing the flow induced signals. FIG. 5B illustrates the optimum placement of electrodes 26 with respect to the artery under measurement. Electrodes 26A are placed on the chest of patient 10 and sense the large electrocardiogram signal produced by the heart at that location. The signals at electrodes 26 and 26A, respectively, are fed to system 24 by means of wires 28 and 30, respectively, connecting with terminals 32 and 34, respectively. This large electrocardiogram signal should be characterized by a sharp spike at point R in the PQRST cardiogram waveform, shown in FIG. 8, which is used to trigger measurement and control circuits and to synchronize the operation of the various components thereof. Synchronization on the R wave is required since the heart beats at somewhat irregular intervals.

Referring to FIG. 2A, there is shown a motorized cart 20 having a magnet system 42 producing a magnetic field directed in one direction as shown by dotted lines 44, which was discussed in detail in connection with FIG. 1.

Alternately, the magnet system can be arranged as shown in FIG. 2B, wherein the magnet system essentially comprises two large magnets 46 and 48 producing magnetic fields directed in two opposing directions, as indicated by dotted lines 50 and 52. In the FIG. 2B embodiment, the motorized cart is moved between two positions. In the first position, the magnet 46 provides a magnetic field 50 in the area of the blood vessel. In the second position, magnet 46 has been removed at the same time that magnet 48 has been moved to the position where it provides a magnetic field 52 in the area of the blood vessel. Magnetic field 52 is preferably of the same order as the magnetic field 50, but it is opposite in polarity.

In this embodiment, the measuring circuit is connected with one polarity while measurements of composite pulsatile signals are made with magnet 46 during $n$ heart cycles, and the measuring circuit is connected with the opposite polarity while similar measurements are made with magnet 48 during a second series of $n$ heart cycles. Because the polarity of the measuring circuit is reversed between the two series, the local ECG is cancelled. Since the magnetic field is also reversed between the two series, the blood flow signals are doubly reversed, which is equivalent to not being reversed at all. Blood flow components will therefore accumulate during the two series of $n$ heart cycles, and therefore the waveform accumulated in the averager will have twice the amplitude that would have been attained with a single magnet of equivalent strength.

While the magnetic field is applied to the vessel under study, a pulsatile blood flow signal appears between the measuring electrodes 26 during each individual heart cycle. The blood flow signal of an individual heart cycle is, however, combined with a local cardiogram signal, also pulsatile, and with random noise, making it impossible to measure and record that individual blood flow signal separately. To isolate the blood flow signal from the local cardiogram, and from the noise, it is necessary to make the measurements during a large number of heart cycles, and to process all the composite pulsatile signals with a waveform averager synchronized by the electrocardiogram sensed from the auxiliary electrodes 26A shown in Fig. 1.

The waveform averager could, in some cases, be of the analog type, but there are important advantages in using as an averager, a digital computer programmed for that purpose.

If the only problem were to eliminate the random noise, it would be sufficient to add in the waveform averager the pulsatile signals measured during a series of heart cycles. If that series comprised a large enough number of heart cycles, the averaged waveform obtained would be sufficiently free from the random noise. In that averaged waveform, the blood flow waveform would, however, be combined with the local cardiogram waveform.

The local cardiogram signal can, because it is repetitive, be eliminated by compensation. One way to implement the compensation is to average the pulsatile signals during a series of heart cycles while the magnetic field has been suppressed. The average waveform obtained in this manner has no blood flow component and represents the local cardiogram waveform, free from random noise. This local cardiogram waveform can be subtracted from the composite waveform comprising in combination both the blood flow and the electrocardiogram, and which is obtained when the measurements are made while the magnetic field is applied to the region of the blood vessel.

FIG. 3 illustrates symbolically the method described above, and refers to it as "Method 1." As indicated, the symbol BFW is an abbreviation for "blood flow waveform." Similarly, LECG is an abbreviation for "local electrocardiogram," meaning the electrocardiogram between the blood flow measuring electrodes 26. The symbol RN is an abbreviation for "random noise," and designates the various noises that are not synchronized with the heart and, therefore, do not accumulate in the averaging process.

The relation (1) of FIG. 3 has two terms. The first term indicates what is added in the averager during $n$ cycles while the magnetic field is active. The second term indicates what is averaged for the same number of cycles while the magnetic field is suppressed. The relation illustrates the fact that, by subtracting one of the waveform averages from the other, one obtains the blood flow waveform free from electrocardiogram influence, with the random noise reduced to a residual value. More precisely, it should be pointed out that the random noise accumulated during $n$ cycles is not much larger than that of the noisiest cycle, while at the same time the waveforms have built up in the averager to exactly $n$ times the amplitude of the waveform for a single cycle.

In accordance with the principle of waveform averagers, including computers programmed for averaging, the repetitive signal to be averaged is sampled frequently and at regular intervals of time during each individual cycle, each sample being identified by the time at which it occurs with respect to the synchronizing signal, taken as time "zero." If $t$ designates the sampling interval, the "pulsatile" signal will be sampled successively at times $t, 2t, 3t, \ldots$ until the essential part of the pulsatile signal has been measured. In the case of blood flow signals, and accompanying local cardiograms, the sampling interval can, for example, be 5 milliseconds with a total of 150 successive samples covering a total time of 750 milliseconds counted from the R wave of the synchronization electrocardiogram, as provided by the auxiliary ECG electrodes 26A, and the synchronization circuit 72 shown in FIG. 4A.

All the signals obtained in successive heart cycles but at the same sampling time i.e., the same number of sampling intervals after the time "zero" of each cycle, are accumulated in one individual memory element of the averager. In an analog averager, the individual memory element can be a capacitor which can accumulate incremental voltages. An example of such analog averager is the Model T DH-9 Waveform Eductor manufactured by Princeton Applied Research Corporation of Princeton, N. J., which is described in the above referred to U.S. Pat. Nos. 3,659,591 and 3,759,247. In a digital computer, the individual memory would be a register, i.e., an elementary adding system for adding numbers, and, for that reason, the individual voltage samples must first be transformed into corresponding numbers by an analog to digital converter. In both cases, there will be as many individual memories as there are sampling intervals.

In the process of averaging a repetitive signal in waveform, each of the individual memories receives the same sample at each of the successive cycles, so that the signal accumulated comprises that sample measured during one cycle, multiplied by the number of cycles as indicated by relation (1) of FIG. 3. In interpreting that relation, it must be remembered that BFW represents the "blood flow waveform"; that is, all the individual signals located in the individual memories respectively corresponding to each sampling interval. The same also applies to LECG which represents the "waveform" of the local cardiogram.

The random noise consists of signals that appear from time to time, and will end up in any of the individual memories, since they are not synchronized with the heart. If one considers the simple case of a single accidental signal occuring only during one heart cycle and covering several sampling intervals in that cycle, it is easy to see that, at the end of the averaging, the amplitude of that accidental signal will have to be compared with the amplitude of the waveform signal multiplied $n$ times. Under these conditions this accidental noise would appear, in the averager, as reduced by the factor $n$. When a plurality of random noises appear in various heart cycles at various times within the various cycles, the improvement follows the same principle, except that, if the random noises are very frequent, some of them could under some circumstances accumulate at the same sampling intervals. The result is that the number of cycles needed in each averaging series will have to be sufficient to clear the general random noise of moderate amplitude. Large accidental noises, of infrequent occurrence, are preferably handled by the system of rejection based on signal amplitude which is described hereinafter in connection with FIGS. 4A and 4B.

Method (2) of FIG. 3 corresponds to a case where the magnetic field is not suppressed during the second series of cycles, but is instead reversed in polarity. Since the polarity of the averaging system is also reversed before that second series of cycles, in order to reverse the polarity of the local cardiogram in that series, the blood flow signal generated by the reversed magnetic field will have been reversed twice with respect to the averaging system. The first reversal occurs because the polarity of the averaging system itself has been reversed. The second reversal occurs because the magnetic field has been reversed. Consequently, the blood flow waveform will, during the second series of heart cycles, enter the averaging system with the same polarity as during the first series of cycles, and the blood flow waveform amplitude in the averager will have doubled.

Reversing the magnetic field can be accomplished, as explained above, by the use of two permanent magnets mounted on a cart as represented in FIG. 2B. If an electromagnet were used, the magnetic field would be reversed by reversing the DC current in the winding. Other combinations of permanent magnets and electromagnets can be employed without changing the basic principle of the invention.

It is to be pointed out that it is not necessary to suppress the magnetic field and to average the local cardiogram for each sequence, since the local cardiogram can be stored in the averaging system and can be subtracted from the composite waveform of several subsequent measuring sequences. However, the memorized local cardiogram would have to be updated from time to time, especialy when the T wave of the local cardiogram has changed position or amplitude as will happen, for example, after smoking, after eating, or after drinking coffee. The stability of the local cardiogram can be monitored using the pair of auxiliary electrodes located where there is a similar local cardiogram, without a substantial blood flow waveform contribution. This monitoring can provide the control system with the necessary information when updating of the memorized LECG is needed.

Referring to FIG. 4A, there is shown a preferred embodiment of the measurement and control system 24. Specifically, the measuring electrodes 26, placed adjacent to the blood vessel under study, sense the blood flow induced signal with its cardiogram component. The composite pulsatile signal is amplified by amplifier 58. Unwanted high and low frequencies, including 60 Hz. noise, are eliminated by a filter circuit 60. The composite signal then continues via line 62 to a temporary single cycle memory and signal selector 64, where it is examined with respect to the predetermined data in a rejection criteria circuit 66, the latter circuits 64 and 66 being shown in detail in FIG. 4B.

As shown in FIG. 4B, the temporary single cycle memory and signal selector 64 of FIG. 4A comprise a comparator 64C to detect the presence of any signal received on line 64B from temporary single cycle memory 64A, which, due to spurious noise, has exceeded the maximum acceptable amplitude as controlled by a maximum acceptable amplitude generator 66A. Any cycle showing an abnormally large signal is rejected and does not cause counter circuit 70 to be advanced, the latter being inhibited by a system 64G, via line 84. System 64G also takes care of replacing the abnormal signal, now cleared from the temporary memory 64A, by the next incoming signal. Should a predetermined number of rejections be exceeded in a given sequence, as detected by system 64E, the already accumulated average residing in an averaging system 68 is cleared and the measurement sequence restarted by system 64F. Signals within the acceptable amplitude range proceed to a second comparator 64D, where it is determined whether the heart cycle duration, that is, the time between the electrocardiogram R wave at the beginning of a cycle and the R wave at the beginning of the next cycle, referred to as the R—R interval, is within the maximum limits as determined by systems 66C and 66B. This R—R interval associated with the cycle being examined is provided to the comparator via line 82, by the control circuit 78, as derived from the synchronization signal.

Signals with acceptable R—R intervals proceed from the temporary single cycle memory 64A to the averaging system 68 via line 86 through a gate 87 which is enabled by a signal on output line 85 from comparator 64D. On the other hand, signals with R—R intervals that are too short or too long are treated in the same way as signals of abnormal amplitude, and therefore rejected and replaced. Thus, each acceptable single cycle waveform is sent from the temporary single cycle memory 64A, via line 86, to the averaging system 68, and at the same time the counter circuit 70 is allowed to advance one step by means of a signal on broken line 84.

Auxiliary electrodes 26A of FIG. 4A sense the electrocardiogram for use in a synchronization circuit 74, which provides trigger pulses on line 74 for the counter circuit 70 and on line 75 for the waveform averaging system 68. The counter circuit 70 will continue to be advanced for each accepted incoming signal until the required number of cycles in this sequence has been reached. This number of cycles is predetermined and entered manually into the counter circuit 70, via line 76.

At the completion of the averaging of $n$ acceptable waveforms, the counter circuit 70 provides a pulse to a control circuit 78 via line 80. The control circuit 78 then inhibits the collection of additional signals, and provides, via line 22, a command for moving the motorized magnet cart 20 of FIG. 1. When the cart 20 has moved to a predetermined position where the magnetic field in the region of the artery has been sufficiently reduced, the control circuit 78 provides a signal on line 82 which causes reversal in the polarity of the signals entering the temporary single cycle memory 64A. Also, control circuit 78 then initiates the collection of a second series of signals, equal in number to the first series. At the completion of the averaging of this second series of composite signals, the averaging system 68 retains only the blood flow waveform now free from electrocardiogram and random noise. The blood flow waveform is then available for display by a recorder 90 which is connected via a digital to analog converter, not shown, and a line 88 to the averaging system 68.

For some vessels, and in particular for the ascending aorta which is located close to the heart, the amplitude of the local cardiogram is very large with respect to the blood flow signals that can be obtained with the magnets available. Because of its timing within the heart cycle, the T wave of the local cardiogram overlaps with the blood flow pulse, and therefore is the portion of the ECG that must be dealt with. At the aorta, the amplitude of the T wave can be as much as 30 or 40 times larger than the amplitude of the flow pulse. In addition, the T wave can vary slowly, both in its amplitude and in its phase with respect to the synchronization signal supplied by the R wave. One way to eliminate the influence of the T wave changes during the averaging process is to cancel most of the T wave during each individual heart cycle by subtracting from it a "bucking" T wave supplied by a pair of auxiliary electrodes. The auxiliary electrodes must be located in such a way that the T wave of the bucking electrocardiogram appearing between them will have the same shape, both in amplitude and in phase, as the T wave appearing between the measuring electrodes, when the amplitudes on the bucking cardiogram have all been equally adjusted by the gain of the corresponding amplifier. Among the combination of possible locations for the two auxiliary electrodes, the simplest is to choose one where the blood flow signal appearing between them is small or negligible, so that it will not subtract much from the blood flow signal appearing between the measuring electrodes in the process of compensation.

Referring to FIG. 5A, which illustrates schematically the case of the ascending aorta, the measuring electrodes 26 are placed under the collar bones and across the sternum so as to sense the maximum blood flow induced signal. The electrode placement is also indicated on FIG. 5B. An auxiliary or bucking electrode 102 is also placed adjacent to the aorta artery, and another auxiliary or bucking electrode 104 is placed further away near the shoulder. The skin is indicated by the numeral 106, and the ascending aorta artery by the numeral 108. As shown more specifically in FIG. 5B, the optimum spacing between the two measuring electrodes 26 is approximately 2X, which is equal to twice the depth S of the artery 108 from the skin 106. The relative amplitude and polarity of the blood flow signal, when the magnetic field is applied, and as can be measured along the skin 106, is represented by curve 101. The stronger the field is at the artery 108, the higher the signal amplitude on the skin becomes. In the absence of a magentic field the blood flow signal amplitude is zero everywhere.

Differential amplifiers 110 and 112 amplify, respectively, the composite pulsatile signal appearing between the measuring electrodes 26, and the bucking signal appearing between the auxiliary electrodes 102 and 204. Resistor 114 is connected at the output of amplifier 112 and determines the bucking coefficient to match the amplitudes of the local and bucking cardiograms for the best cancellation. The outputs of amplifiers 110 and 112, respectively, are fed via resistors 114 and 116 to the input of an adder 118, which adds the bucking signal to the combined local cardiogram and blood flow component signal. The result at the output line 120 is a bucked signal, comprising the blood flow component now combined only with a much reduced "residual" cardiogram component.

Since the local cardiogram component of the composite pulsatile signal at electrodes 26 is not completely identical to the bucking cardiogram signal at electrodes 102 and 104, the residual cardiogram component of the pulsatile signal on output line 120 cannot be ignored and must be substantially eliminated. The small residual or "bucked" cardiogram, which is still mixed with the blood flow signal after the bucking operation, is eliminated by compensation with a bucked cardiogram averaged over a series of heart cycles while the magnetic field has been removed. This is the same process as the one described with reference to FIG. 3 for compensating the local electrocardiogram in cases where no bucking is needed because the ECG is not much larger than the blood flow signal.

FIG. 6 is a flow diagram of the complete process of "bucking" most of the electrocardiogram component out of the composite signal during the series of heart cycles with the magnetic field applied, and then removing the "residual" cardiogram by subtracting a similar "residual" cardiogram averaged during a series of heart cycles without a magnetic field and, therefore, without the blood flow signal.

Figure 7:
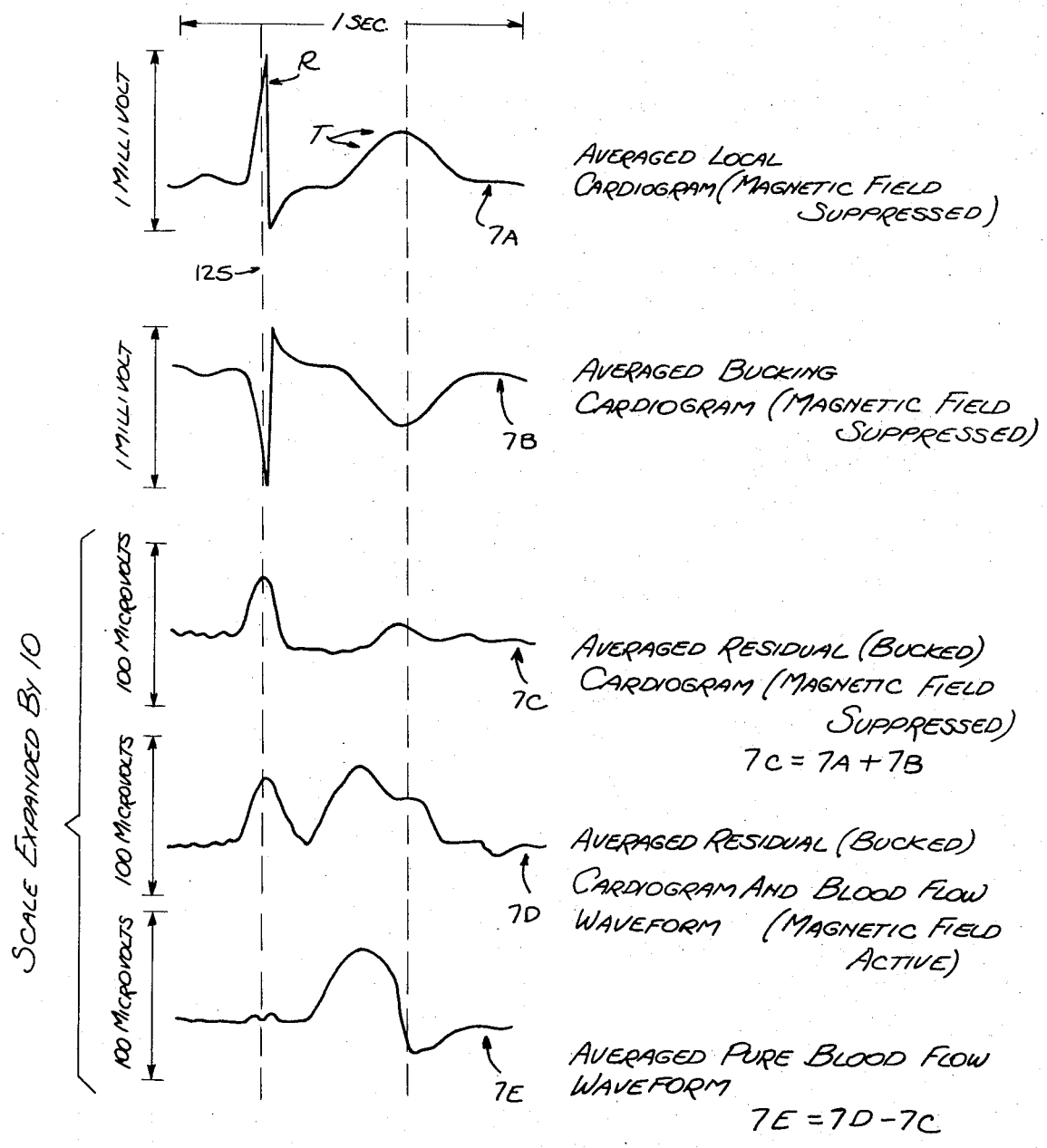
FIGS. 7A through E show graphic representations of the various waveforms associated with the bucking opeation described with reference to FIG. 6.
Figure 8:
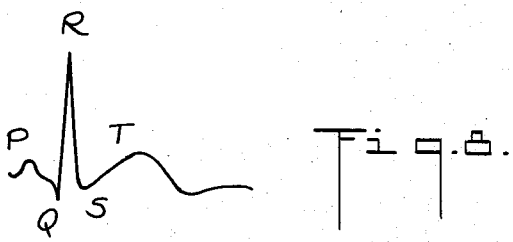

FIG. 7 shows some of the successive waveforms that are obtained in the averaging system during the processing sequence. The waveforms are shown synchronized in time by the dotted line 125. More specifically, in FIG. 7 there is shown the local ECG waveform 7A from the measuring electrodes 26 and the bucking ECG waveform 7B from the auxiliary electrodes 102, 104 that were both obtained with the magnetic field suppressed, and averaged over a number of cycles to remove the random noise. These two averaged waveforms 7A and 7B were recorded separately for illustration purposes. In the process of "bucking", illustrated by the flow chart of FIG. 6, these two waveforms 7A and 7B are combined for compensation during each cycle, and only their difference is averaged in waveform to arrive at the averaged residual ECG (local minus bucking) free of noise, as indicated by numeral 122 of FIG. 6 and waveform 7C of FIG. 7.

The process occurring while the magnetic field is active is represented on the left side of FIG. 6. The bucking electrocardiogram 124 from the auxiliary electrodes 102, 104 is subtracted continuously during each cycle from the composite pulsatile signal 126 originating at the measuring electrodes 26 by means of a system at 128. The result of the subtraction is a single cycle composite pulsatile blood flow signal at 130 which is mixed only with the residual cardiogram and some random noise. A series of n such composite blood flow signals is averaged in waveform during n heart cycles by a system at 132. The result is an averaged composite signal containing, in combination, the blood flow waveform and the residual cardiogram, free of random noise, as indicated at 134 of FIG. 6 and waveform 7D of FIG. 7. From the signal 134, there must now be removed the residual cardiogram 122. Residual cardiogram 122 is the waveform which is obtained by the process described by the flow chart on the right side of the FIG. 6. Here, there is described the operation during another series of n heart cycles, but with the magnetic field suppressed. Except for the fact that the magnetic field is suppressed, this operation on the right side of the flow chart is essentially the same as the operation described on the left side, and is therefore not repeated in detail. The operation produces the waveform of the residual cardiogram averaged over n cycles and free of noise, as indicated at 122 of FIG. 6 and by the waveform 7C of FIG. 7.

The averaged residual cardiogram waveform 7C (122 of FIG. 6) is now subtracted from the composite averaged waveform 7D (134 of FIG. 6) by a system at 136 to produce the wanted result at 138, namely the averaged blood flow waveform 7E of FIG. 7. Waveform 7E is free from local electrocardiogram and random noise components. This waveform information can now be displayed at 140 in the form of a curve by adequate means such as a strip chart recorder, X Y plotter, and cathode ray tube.

In the description above in connection with FIGS. 5, 6 and 7, use was made of four electrodes, namely, two measuring electrodes 26 and two auxiliary or bucking electrodes 102 and 104. In some cases, and in particular in the case of the ascending aorta, the two pairs can have one electrode in common. In that case, one can use for one of the bucking electrodes a location near either one of the shoulders of the patient, as for example, the electrode 104 shown in FIGS. 5A and 5B. The other bucking electrode should then be the measuring electrode 26 that is nearest to said shoulder. This provides a three electrode array that has advantages other than the elimination of one electrode. One such advantage is that the auxiliary pair, described above for the bucking, will, when the magnetic field is applied, have a blood flow component of such polarity that, in the subtraction of the bucking signal from the measuring signal, it will add to the blood flow component provided by the measuring electrodes. There is, therefore, in that case an increase of the final blood flow signal, and, consequently, an increase in the signal to noise ratio. Referring to FIG. 5A, the three electrode array would be realized by connecting the two input terminals of amplifier 112 respectively to electrode 104 and to the one electrode 26 that is located nearest to electrode 104. Electrode 102 would be omitted.

Another advantage of the three electrode system described above is that each of the three electrodes is located at a non-critical position with respect to the blood flow signal distribution on the skin. Each of the electrodes 26 is at a point of maximum or minimum signal, so that a small change of position toward either the left or the right of the subject will result in a comparatively small change of the measured blood flow signals. The same is true for electrode 104 which is in a region of small signal amplitude. The situation would, however, be different for electrode 102 which is in a region of strong variation of the signal amplitude with respect to lateral position. As a result, the three electrode array would be advantageous when measurements have to be made from time to time on the same subject, i.e., at time intervals wherein the electrodes must be removed after one series of measurements and subsequently placed on the skin again for the next series, which could be days or even months later. This is important when the purpose of the measurements is to follow the variation of the signal with time over long periods.

The bucking system described above is very useful when the averager is of the analog type, or when a digital computer is used for averaging in conjunction with analog to digital converters that do not have a large dynamic range. With the method described, the averaging can be done with analog waveform averagers or with digital computers equipped with analog to digital converters having a dynamic range of 10 bits, or even nine bits. However, with a dynamic range below nine bits even that approach would be marginal for measurements close to the heart. If a digital computer is used in conjunction with analog to digital converters having a dynamic range of eleven bits or more, that is, a range of 1 to 2,048 or more, then it is possible to use the same method as was described for removing the cardiogram component from blood flow signals measured at locations far from the heart. This method has been described above in connection with FIG. 3. One advantage of operating in this manner when the dynamic range of the instrument is sufficient is that the local cardiogram itself is memorized, while in the case of bucking it is the residual or bucked cardiogram that is memorized for subtraction. When it is the local cardiogram itself that is memorized, it can be displayed in averaged form together with the blood flow waveform, if desired, since it may contain useful information about the T wave and its variation with time.

When measurements are made close to the heart, the local cardiogram between the measuring electrodes is strong and sharp, and, therefore, sufficient to supply the synchronization signal. In such case, it is not necessary to use auxiliary electrodes for the synchronization.

When measurements are made on arteries near the heart, and in particular on the aorta, it is also possible to remove the local cardiogram component from the composite blood flow signal by using a local cardiogram average which was accumulated during a series of heart cycles in the absence of magnetic field. This local cardiogram average is taken shortly before or after the series taken with the magnetic field applied, which latter series includes the blood flow waveform. It is even better to average the local cardiogram before, and again after the series containing the blood flow signal.

In that case, the computer can be programmed to compare these two local cardiograms, measured respectively before and after the blood flow series, to check the stability of the T wave over the corresponding time interval.

The computer can also be programmed to reject the blood flow waveform in cases where the local cardiogram waveforms, taken before and after the blood flow averaging sequence, are too different from each other, either in amplitude or in phase. A difference of amplitude of the T wave will show as a single peak on the ECG waveform difference, while a difference of phase will show as two adjacent peaks of opposite polarity. A rejection control based on positive and negative limits of the amplitude of the ECG waveform difference is, therefore, satisfactory to take care of both cases. It will permit the automatic elimination of the blood flow waveform, already stored in the averager, for a sequence during which the T wave has changed too much and, therefore, prevent this possibly degraded blood flow waveform from being recorded. To accomplish that purpose, the computer will be programmed to supply three separate waveform averaging systems, respectively, for the series combining blood flow and ECG, and the series before and after which both show ECG(s) without blood flow.

The local cardiogram averaged just before applying the magnetic field, and starting a new series of measurements including the blood flow, can be used to remove the cardiogram component from the composite signal each of individual cycle of that series, as it will appear in the temporary memory. This will remove the large repetitive signals due to the T wave of the local cardiogram, and leave in the temporary memory only the blood flow signal and the random noise. The temporary memory is then ready for the detection of random signals of abnormal amplitude so that the cycles having such abnormal signals can be rejected as described in connection with FIGS. 4A and 4B.

In the description above, the method referred to as bucking has been described primarily for reducing the amplitude of the ECG component in the composite signal when that ECG component is very large with respect to the blood flow signal. This bucking method can also be used in cases where the ECG component is small, but not small enough to be ignored. In such cases, the bucking method can reduce the ECG component enough for the residual or bucked ECG to be practically negligible with respect to the blood flow component. An example of that situation would exist with the brachial artery, normally measured just above the elbow. When the ECG component can be sufficiently reduced by bucking, it is not necessary to average the ECG without magnetic field, and the magnetic field never needs to be changed: this means that the magnet can remain in a fixed position. The averaging remains, however, necessary to eliminate the random noise. Individual cycle signal rejection for noise amplitude and/or for heart cycle duration also remains necessary.

Although the above description is directed to the preferred embodiments of the invention, it is noted that other variations and modifications will be apparent to those skilled in the art, and, therefore, may be made without departing from the spirit and scope of the present disclosure.

What is claimed is:

1. A blood flow measuring system comprising:
   first sensory means adapted to be positioned on the skin of a living being at such locations that a strong and sharp cardiogram can be repeatedly obtained to use as a synchronizing signal and as a clock;
   means for producing in the region of a blood vessel a stable and sufficiently homogeneous magnetic field having an intensity large enough to generate measurable blood flow signals in said region;
   second sensory means adapted to be placed on the skin or in the subcutaneous tissue of said living being at locations adjacent to said vessel;
   amplifying means for amplifying the composite pulsatile signals sensed by said second sensory means during successive heart cycles, said composite pulsatile signals generally including a blood flow waveform component which is proportional not only to the blood flow but also to the intensity of the magnetic field, and a random noise component;
   measuring means synchronized by said synchronizing signal derived from said first sensory means to average, in waveform, a predetermined number of composite pulsatile signals from said second sensory means accumulated during a series of heart cycles, said measuring means including a waveform averager having individual storage elements which accumulate voltage samples of said pulsatile signals taken at corresponding time intervals of all successive heart cycles of said series;
   signal selector means including comparator means connected at the input to said waveform averager for comparing each incoming pulsatile signal with predetermined acceptable signal characteristics, and gating means for enabling said incoming pulsatile signal to be accumulated by said waveform averager only if said pulsatile signal is within said acceptable signal characteristics; and
   means for indicating the waveform averaged blood flow signal.

2. System as recited in claim 1, wherein said signal selector means includes reference means for providing maximum and/or minimum acceptable amplitude for each pulsatile signal to be accumulated by said waveform averager, said reference means being connected to said comparator means.

3. System as recited in claim 1, wherein said signal selector means includes a reference means for providing an acceptable pulsatile signal duration defined by the time duration between successive pulsatile signals as characterized by the synchronizing signal in each cycle, said reference means being connected to said comparator means.

4. A method for measuring the blood flow waveform in a blood vessel of a living being comprising:
   producing a strong and homogeneous magnetic field of an intensity sufficient to produce measurable blood flow signals in the region of said blood vessel;
   sensing a plurality of successive composite pulsatile signals by measuring electrodes placed on the skin or in the tissue of said living being at a location adjacent said blood vessel, said composite pulsatile signals generally comprising a blood flow waveform component, and a random noise component;
   deriving a synchronizing signal from a cardiogram signal sensed by auxiliary electrodes positioned on the skin of the living being;

comparing each composite pulsatile signal with predetermined acceptable waveform characteristics to determine which signals are acceptable for waveform averaging;

selecting only those composite pulsatile signals which have been determined to be acceptable for waveform averaging;

waveform averaging a predetermined number of successive acceptable composite pulsatile signals sensed by said measuring electrodes during a series of heart cycles occurring while said magnetic field is in said region, said waveform averaging being accomplished by accumulating voltage samples of said pulsatile signals taken at corresponding time intervals of all successive heart cycles of said series; and indicating the waveform averaged blood flow signal.

5. A blood flow measuring system comprising:

first sensory means adapted to be positioned on the skin of a living being at such locations that a strong and sharp cardiogram can be repeatedly obtained to be used as a synchronziing signal and as a clock;

means for producing in the region of a blood vessel a stable and sufficiently homogeneous magnetic field having an intensity large enough to produce measurable blood flow signals for said region;

second sensory means adapted to be placed on the skin or in the subcutaneous tissues of said living being at locations adjacent to said vessel;

amplifying means for amplifying the composite pulsatile signals sensed by said second sensory means during successive heart cycles, said composite pulsatile signals generally comprising a blood flow waveform component proportional not only to the blood flow but also to the intensity of the magnetic field, a local electrocardiogram component and random noise components;

measuring means synchronized by said synchronizing signal derived from said first sensory means to average, in waveform, a predetermined number of composite pulsatile signals from said second sensory means accumulated during a series of heart cycles; to eliminate the random noise signals, said measuring means including a waveform averager having individual storage elements which accumulate voltage samples of said pulsatile signals taken at corresponding time intervals of all successive heart cycles;

means for producing a cardiogram signal of said living being for use as a bucking signal, said means including subtraction means for subtracting said bucking cardiogram signal from said composite pulsatile signals provided at said second sensory means, whereby the relative amplitude of said local electrocardiogram component with respect to said blood flow waveform amplitude is reduced, either continuously during each cycle of said series of heart cycles, or on the averaged waveform of said series, so that the reduced amplitude of said local cardiogram component is made small and practically negligible with respect to said blood flow waveform amplitude; and means for indicating the waveform averaged signal.

6. System as recited in claim 5, wherein said second sensory means comprise more than two measuring electrodes, two of said measuring electrodes being adapted to be located near to the blood vessel, and the other said electrode or electrodes being adapted to be in such a position that, by combination with the first said electrodes through amplifying and adding circuits, said other electrode or electrodes provide the bucking cardiogram waveform which essentially cancels the local cardiogram waveform component which would otherwise be be mixed with the blood flow waveform in the composite signal measured between the two said measuring electrodes that are near the blood vessel.

7. System as recited in claim 5, wherein said means for producing a cardiogram signal for use as a bucking signal comprises additional sensory means adapted to be placed on the skin of the said living being.

8. System as recited in claim 7, wherein said subtraction means includes differential amplifier means connected at its inputs, respectively, to said second sensory means and said additional sensory means, resistive means connected at an output of sad differential amplifier means for matching the amplitudes of said bucking cardiogram and said local cardiogram component, whereby the outputs of said differential amplifier means are substantially matched by means of said resistive means.

9. System as recited in claim 8, further comprising adder means for adding the outputs of said differential amplifier means.

10. System as recited in claim 5, wherein said measuring means includes counter means for counting said predetermined number of incoming pulsatile signals which are received in said waveform averager, said counter means providing a control output signal when said predetermined number of pulsatile signals has been counted.

11. System as recited in claim 10, wherein the output of said counter means is used to terminate the accumulation in said waveform averager of a predetermined number of pulsatile signals.

12. System as recited in claim 10, wherein the output of said counter means is connected to a means for changing said magnetic field to thereby activate the same.

13. A method for measuring the blood flow waveform in a blood vessel of a living being, comprising:

producing a strong and homogeneous magnetic field of a first intensity value in the region of said blood vessel;

sensing a purality of successive composite pulsatile signals by measuring electrodes placed on the skin or in the tissue of said living being at a location adjacent said blood vessel, said composite pulsatile signals generally comprising a blood flow waveform component, a local cardiogram component and a random noise component;

deriving a synchronizing signal from a cardiogram signal sensed by auxiliary electrodes positioned on the skin of the living being;

comparing each composite pulsatile signal with predetermined acceptable waveform characerictics to determine which signals are acceptable for waveform averaging;

selecting only those composite pulsatile signals which have been determined to be acceptable for waveform averaging;

waveform averaging a predetermined number of successive acceptable composite pulsatile signals sensed by said measuring electrodes during a first series of heart cycles occurring while said magnetic field in said region is of said first intensity value, said waveform averaging being accomplished by accumulating voltage samples of said pulsatile signals taken at corresponding time intervals of all successive heart cycles of said first series;

changing said magnetic field from said first intensity value to a second intensity value in the region of said blood vessel and thereafter waveform averaging a predetermined number of composite pulsatile signals sensed by said measuring electrodes during a second series of herat cycles;

combining said averaged first series of composite pulsatile signals with said averaged second series of composite pulsatile signals in a manner whereby the local cardiogram component is eliminated to thereby derive a blood flow waveform which is substantially free from the local cardiogram; and indicating the waveform averaged blood flow signal.

14. Method as recited in claim 13, further comprising: prior to the step of waveform averaging each of said composite pulsatile signals, temporarily storing each of said composite pulsatile signals until it has been determined which signals are accepted or rejected for waveform averaging.

15. Method as recited in claim 13, wherein said composite pulsatile signals are compared with a reference means providing a maximum and/or minimum acceptable amplitude for each pulsatile signal.

16. Method as recited in claim 13, wherein said composite pulsatile signals are compared with a reference means providing an acceptable pulsatile signal duration defined by the time duration between successive pulsatile signals as characterized by the synchronizing signal in each cycle.

17. Method as recited in claim 13, further comprising: producing a cardiogram signal of said living being for use as a bucking signal, and subtracting said bucking cardiogram signal from said composite pulsatile signals provided at said measuring electrodes, whereby the relative amplitude of said local cardiogram component with respect to said blood flow waveform amplitude is reduced.

18. Method as recited in claim 17, further comprising: adjusting the amplitude of said bucking cardiogram signal so that it is the same amplitude as the local cardiogram component of the composite pulsatile signals, whereby subtraction of said adjusted bucking cardiogram signal from said composite pulsatile signal will substantially reduce or cancel the local cardiogram component of said composite pulsatile signal.

19. A method as recited in claim 13, wherein said magnetic field during one of said series of heart cycles is of sufficient intensity to generate measurable blood flow signals in the region of the blood vessel, and the magnetic field intensity during the other of said series of heart cycles is essentially suppressed.

20. A method as recited in claim 19, wherein said magnetic field is suppressed by moving said magnetic field to a location remote from the region of said blood vessel.

21. Method as recited in claim 13 wherein said waveform averaging of said first series of successive composite pulsatile signals occurs while said magnetic field in said region is suppressed to produce a waveform averaged local cardiogram of said first series of heart cycles, said waveform averaging of of said second series of successive composite pulsatile signals occurs while said magnetic field in said region is active, and further comprising the steps of waveform averaging a third series of heart cycles occurring while said magnetic field in said region is suppressed to produce a local cardiogram average of said third series of heart cycles, comparing the local cardiogram averaged during said first series with the local cardiogram averaged during said third series, to determine the stability of the local cardiogram whereby the composite pulsatile signals sensed during said second series of heart cycles can be prevented from being processed or recorded if the waveform difference between said first and third series of averaged local cardiogram signals is in excess of prescribed limits.

22. Method as recited in claim 13, wherein said step of changing said magnetic field from said first intensity value to a second intensity value in the region of said blood vessel is preceeded by deactivating and reversing the polarity of the circuits used to obtain said composite pulsatile signals after said first series of heart cycles are waveform averaged, suppressing said magnetic field while said circuits are deactivated, and then reactivating said circuits for sensing and waveform averaging said second series of heart cycles, whereby the local cardiogram signals sensed during said first series of heart cycles will be substantially cancelled by the local cardiogram signals sensed during said second series of heart cycles, making available the blood flow waveform without the local cardiogram component.

23. Method as recited in claim 13, wherein the magnetic field intensity during one of said series of heart cycles remains essentially suppressed so that a local cardiogram is waveform averaged during said series of heart cycles, and further comprising the step of storing said averaged local cardiogram as a source for subsequent series of herat cycles, until such time as said stored local cardiogram needs to be updated.

24. Method as recited in claim 23, wherein said step of combining said averaged first series of signals with said averaged second series of signals is carried out by subtracting the averaged local cardiogram which has been averaged and stored, during a series of heart cycles, from the composite pulsatile signals measured in subsequent series of heart cycles taken while said magnetic field remains applied in the region of said blood vessel, whereby the local cardiogram component is essentially cancelled out from said composite pulsatile signals.

25. Method as recited in claim 13, wherein one or more of said auxiliary electrodes is the same as one or more of said measuring electrodes.

26. A blood flow measuring system comprising: 1
first sensory means adapted to be positioned on the skin of a living being at such locations that a strong and sharp cardiogram can be repeatedly obtained to be used as a synchronizing signal and as a clock;
means for producing in the region of a blood vessel a stable and sufficiently homogeneous magnetic field of a first intensity value;
means for changing said magnetic field in said region from said first intensity value to a second and substantially different intensity value, at least one the two said magnetic field intensity values being large enough to generate measurable blood flow signals in said region;

second sensory means adapted to be placed on the skin or in the subcutaneous tissues of said living being at locations adjacent to said vessel;

amplifying means for amplifying the composite pulsatile signals sensed by said second sensory means during successive heart cycles, said composite pulsatile signals generally comprising a blood flow waveform component proportional not only to the blood flow but also to the intensity of the magnetic field, a local electrocardiogram component and random noise components;

measuring means synchronized by said synchronizing signal derived from said first sensory means to average, in waveform, a first predetermined number of composite pulsatile signals from said second sensory means accumulated during a first series of heart cycles occurring when the magnetic field in said region is of said first intensity value, and to average a second predetermined number of composite pulsatile signals from said second sensory means accumulated during a second series of heart cycles occurring when the magnetic field in said region is of said second intensity value, said measuring means including a waveform averager having individual storage elements which accumulate voltage samples of said pulsatile signals taken at corresponding time intervals of all successive heart cycles of said first series and said second series;

signal selector means including comparator means connected at the input to said waveform averager for comparing each incoming pulsatile signal with predetermined acceptable signal values, and gating means for enabling said incoming pulsatile signal to be accumulated by said waveform averager only if said pulsatile signal is within said acceptable values;

means to subtract from each other the waveforms registered in said waveform averager respectively during the first and the second series of heart cycles to obtain the blood flow waveform substantially free from electrocardiogram and random noise influence; and means for indicating the waveform averaged blood flow signal.

27. System as recited in claim 26, wherein said signal selector means includes reference means for providing maximum and/or minimum acceptable amplitude for each pulsatile signal to be accumulated by said waveform averager, said reference means being connected to said comparator means.

28. System as recited in claim 26, wherein said signal selector means includes a reference means for providing an acceptable pulsatile signal duration defined by the time duration between successive pulsatile signals, as characterized by the synchronizing signal in each cycle, said reference means being connected to said comparator means.

29. System as recited in claim 26, further comprising a temporary memory connected at the input to said signal selector means, said temporary memory being connected to receive and store the composite pulsatile signals after they are amplified by said amplifier means, said temporary memory being connected to said comparator means for enabling said signal selector means to pass on to said averager means the selected pulsatile signal stored in said temporary memory.

30. System as recited in claim 26, wherein said measuring means includes counter means connected to said signal selector means for counting a predetermined number of incoming pulsatile signals which are accepted by said signal selector means, said counter means providing a control output signal when said predetermined number of pulsatile signals has been counted.

31. System as recited in claim 30, wherein the output of said counter means is used to terminate the accumulation in said waveform averager of a predetermined number of pulsatile signals.

32. System as recited in claim 30, wherein the output of said counter means is connected to said means for changing said magnetic field to thereby activate the same.

33. System as recited in claim 32, wherein said means for producing a strong and homogeneous magnetic field comprises a permanent magnet system.

34. System as recited in claim 33, wherein said permanent magnet system includes motorized means for moving said system from a first position such that the strong and homogeneous field is applied to the region of the blood vessel, to a second position such that the magnetic field in the region of the blood vessel is essentially suppressed.

35. System as recited in claim 33, wherein said permanent magnet system includes motorized means for moving said system from a first position such that the magnetic field is applied to the blood vessel with a first polarity, to a second position such that the magnetic field is applied to the region of the blood vessel with the opposite polarity.

36. System as recited in claim 26, wherein said second sensory means comprise more than two measuring electrodes, two of said measuring electrodes being adapted to be located near the blood vessel, and the other said electrode or electrodes being adapted to be in such a position that, by combination with the first said electrodes through amplifying and adding circuits, said other electrode or electrodes provide a cardiogram waveform which essentially cancels the local cardiogram waveform component which would otherwise be mixed with the blood flow waveform in the composite signal measured between the two said measuring electrodes that are near the blood vessel.

37. System as recited in claim 26, further comprising additional sensory means adapted to be placed on the skin of said living being to produce a bucking cardiogram waveform, and subtraction means for subtracting said bucking cardiogram waveform from said composite pulsatile signals provided at said second sensory means to thereby essentially cancel the local electrocardiogram component of said composite pulsatile signals.

38. System as recited in claim 37, wherein said subtraction means includes differential amplifier means connected respectively to said second sensory means and said additional sensory means, resistive means connected at an output of said differential amplifier means for matching the amplitudes of said bucking cardiogram produced by said additional sensory means and said local cardiogram component produced by said second sensory means, whereby the outputs of said differential amplifier means are substantially matched by means of said resistive means.

39. System as recited in claim 38, further comprising adder means for adding the outputs of said differential amplifier means.

* * * * *